3,114,628
PROCESS FOR REFINING BLISTER COPPER
Eugene R. Redmond, Oracle, Ariz., assignor to Brian Jackson Associates, Inc., Tucson, Ariz., a corporation of Arizona
No Drawing. Filed May 20, 1959, Ser. No. 814,383
4 Claims. (Cl. 75—75)

This invention relates to a method of refining blister copper. More specifically, the invention relates to an improvement in the method of refining blister copper described in my co-pending application, Serial No. 430,725, now Patent No. 2,895,821, of which this application is a continuation-in-part.

In the said co-pending application I describe a process whereby blister copper may be refined in the converter in which it is formed by blowing the blister copper through the worm stage, adding a silica flux as the worm is about to disappear, continuing the blow for a few minutes until the silica has formed a solid coating and pouring the copper out from under the solid coating.

The particular point at which to add the silica flux was described as being determined either by taking samples of the material as it was blown through the worm stage by observing the sparks in the gas stream leaving the converter.

The point at which to terminate the blow was described in said co-pending application as being determined either by further sampling or by observing the gaseous flames leaving the converter.

Although these methods of determining the points at which to add the silica and to terminate the blow are generally satisfactory, they do have the drawback that they depend on the skill of the converter operator. I now find, however, that certain instruments can be used to indicate these points either visually or audibly.

It is, accordingly, an object of this invention to improve the process of said co-pending application.

Another object of the invention is to use mechanical means to indicate the points or stages in a process for refining blister copper in a converter at which silica flux is added to the molten mass therein and at which time the blow is terminated.

A further object of the invention is to use a conventional converter instrument to indicate the point in a process of refining blister copper in the converter in which it is formed at which the molten mass is just about to pass through the "worm" stage.

These and other objects will become apparent as this description proceeds.

The term "worm" copper, as herein used, refers to a product which contains more copper oxide than blister copper. In other words, it is copper which has been carried further along in the oxidizing process. A sample of "worm copper" on cooling first solidifies over the top and then the molten copper, under pressure of the contained gases, breaks through the solid layer and runs over it as a worm might crawl. This is commonly spoken of as "throwing a worm." If samples are taken of copper as it is blown beyond the worm stage, it is seen that the "worm" becomes smaller and smaller as the blowing is continued and eventually disappears.

In converting copper in a converter of the tilting type, no fuel is added during the process except that generated in the charge or molten mass by the oxidation of iron, sulphur, and other impurities. Air is admitted to the molten mass in the converter through a row of tuyeres. The converter can be tilted with respect to the tuyeres so that the air is admitted through the bottom or at any other point between the bottom and the top of the charge. The most rapid oxidation and, consequently, the maximum amount of heat is generated when the air is admitted near the bottom of the molten mass. The temperature of the charge is usually allowed to reach 2300 degrees F. during the blowing of copper matte to produce copper sulphide.

The optimum temperature for blowing copper sulphide to produce blister copper is, on the other hand, about 2200 degrees F.; consequently, it is necessary to cool the charge by adding solid cakes or chips of slag or scrap blister copper before air is again blown into the charge.

As the blowing continues at such a reduced temperature, traces of iron and silica from the chips of slag and from the previous slagging operation rise to the top of the molten mass and solidify into granules of slag. If the molten mass is not to be blown past the blister copper stage, the granules of slag may be removed from the converter ahead of the blister copper without increasing the temperature of the charge. If, however, the charge is to be over-blown or blown past the blister copper stage, which is common practice where the charge is to be transferred to an anode furnace, it is deemed necessary in the prior art to blow the charge at an increased temperature. The ebullition of the molten mass carries some of the slag down to the tuyeres. This slag accumulates around the outlet of the tuyeres choking them off enough to materially reduce the flow of air into the molten mass. At this point it is deemed necessary in the prior art to mechanically or manually punch the tuyeres open so that sufficient air will be admitted to the charge to keep its temperature up. When the temperature increases, the granulated slag becomes liquid again and reenters the molten bath. This re-solution of the slag results in a large quantity of highly reactive liquid oxide slag to rehandle and transfer. The combination of the increased temperature and the reactive slag greatly shortens the lift of the brick lining in the converter.

As pointed out in said co-pending application, I have found that copper can be blown past the blister stage at a reduced temperature by adding silica to the charge as the worm is about to disappear.

I now find that the point at which the worm is about to disappear can be readily and accurately determined by observing the ordinary flowmeter and temperature indicator found on all modern converters. Once the charge is in the blister stage, the flowmeter will remain relatively stable until the worm is about to disappear. Then the air rate-of-flow meter takes a decided drop indicating that the tuyeres are closing over, as described above. Simultaneously the temperature indicator starts to rise. At this point I add silica to the top of the molten mass and freeze the granules of slag into a solid blanket or coating. I rock the converter enough to expand this coating from side-to-side and edge-to-edge on top of the molten mass. As soon as the coating is in place, the tuyeres automatically open and the rate-of-flow meter rises showing an increase of air being introduced into the converter. As the blow continues, the rate-of-flow meter will again take a decided drop indicating that the tuyeres are once more choking down. It is at this point that I remove the molten mass from beneath the solid coating by rotating the converter about its horizontal axis.

Examples of my improved process are as follows:

Example I

An 80 ton charge of blister copper was blown with air starting at the rate of about 28,000 c.f.m. and at a temperature of about 2180° F. The flowmeter dropped steadily until it reached 26,000 c.f.m. Then it made a sudden drop to 24,500 c.f.m. At the same time, the temperature increased to about 2200° F. One thousand pounds of silica was added. The flowmeter rose to 26,500 c.f.m. and the temperature dropped to approximately 2180° F. The blow was continued for approximately five minutes when the flowmeter dropped to about 24,250 c.f.m. and the temperature indicator rose to 2200° F. Fifteen hundred pounds of silica was added and the converter was rocked on its horizontal axis until the silica had spread from side-to-side and edge-to-edge of the converter on the surface of the bath. In a few seconds the flowmeter rose to 25,500 c.f.m. while the temperature indicator dropped to about 2000° F. The flowmeter then started dropping again. It was noted that the silica had formed a solid coating over the molten mass; therefore, the blow was terminated and the molten mass was poured out of the converter leaving the solid coating behind.

*Example II*

A 75 ton charge of blister copper was blown with air starting at the rate of about 26,500 c.f.m. As the blow continued, the flowmeter suddenly started dropping. Two and one half tons of silica were added and the converter was rocked to spread the silica over the surface of the charge. The flowmeter rose to 26,500 c.f.m. and remained steady for about five minutes when it started dropping rather rapidly. It was noted that the silica had formed a solid blanket over the charge; therefore, the blow was terminated and the charge was withdrawn from beneath the blanket.

It is to be noted that the temperature indicator was not used in the second example. This is because the flowmeter made a sharp enough drop to indicate that the tuyeres were choking off. In the first example, it took a correlation between the flowmeter and the temperature indicator to ascertain the point at which the tuyeres began choking off.

It is to be understood that any particular air volume or temperature is not essential to my improved method of determining the point at which to add the silica, but rather the deviation from previously reached air volumes or temperatures.

In summary, it is well to mention that the prior art practice in smelters employing anode furnaces which receive molten copper from converters included blowing the charge in the converter as far past the blister stage as was practicable to reduce piping time in the anode furnace. This not only resulted in the rapid deterioration of the converter lining and the accumulation of highly reactive slag to rehandle and transfer to another converter, but still necessitated from three to five hours piping time in the anode furnace to oxidize impurities not removed in the converter.

My process, on the other hand, not only prevents the formation of highly reactive slag and the accompanying excessive temperatures, but reduces piping time in the anode furnace to a maximum of only a few minutes and increases the life of converter linings from two to over three times the life obtained from prior art practices.

It will be obvious to those skilled in the art that various devices can be used to obtain visual or audible signals when the flowmeter deviates a specified percentage from a previously reached maximum. One such device is described in Patent No. 2,813,169 and could be used to activate a light or a bell to indicate the points at which to add the silica and to terminate the blow.

I claim:

1. In a process of refining blister copper in a converter having a flowmeter including the steps of blowing air into a molten mass of blister copper until the worm stage is reached, adding silica to said mass as the worm is about to disappear, continuing the blow until the silica has formed a solid coating over said mass, and pouring said mass out from under said coating, the improvement comprising the step of determining that said worm is about to disappear by observing that the said flowmeter indicates a sudden drop in the volume of air being blown into said mass.

2. The process of claim 1 including also the step of determining that said solid coating has formed by observing that said flowmeter indicates a second sudden drop in the volume of air being blown into said mass.

3. The process of claim 1 including also the step of observing that the temperature of said mass suddenly increases concurrently with said sudden drop in the volume of air being blown into said mass.

4. In a process of refining blister copper in a converter having a flowmeter and a temperature indicator including the steps of blowing air into a molten mass of blister copper, until the worm stage is reached, adding silica to said mass as the worm is about to disappear, continuing the blow until said silica has formed a solid coating over said mass and pouring said mass out from under said coating, the improvement comprising the steps of determining that said worm is about to disappear by observing that said flow meter indicates a first sudden drop in the volume of air being blown into said mass concurrently with a first sudden rise in the temperature of said mass, and determining that said solid coating has formed by observing a second sudden drop in the volume of air being blown into said mass concurrently with a second sudden increase in said temperature.

References Cited in the file of this patent

UNITED STATES PATENTS 723,500    Thofehrn et al. _____ Mar. 24, 1903

FOREIGN PATENTS 472,626    Great Britain _____ Sept. 23, 1937

OTHER REFERENCES

Newton: Metallurgy of Copper, pages 196, 197, 202. 1942.